US010020859B2

(12) United States Patent
Prasad et al.

(10) Patent No.: US 10,020,859 B2
(45) Date of Patent: Jul. 10, 2018

(54) CHANNEL FEEDBACK FOR VERTICAL AND FULL-DIMENSIONAL BEAMFORMING

(71) Applicant: NEC Laboratories America, Inc., Princeton, NJ (US)

(72) Inventors: Narayan Prasad, Wyncote, PA (US); Guosen Yue, Plainsboro, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 194 days.

(21) Appl. No.: 14/156,064

(22) Filed: Jan. 15, 2014

(65) Prior Publication Data

US 2014/0198751 A1 Jul. 17, 2014

Related U.S. Application Data

(60) Provisional application No. 61/753,736, filed on Jan. 17, 2013.

(51) Int. Cl.
*H04B 7/06* (2006.01)
*H04B 7/0452* (2017.01)
*H04B 7/024* (2017.01)
*H04L 5/00* (2006.01)

(52) U.S. Cl.
CPC ........... *H04B 7/0632* (2013.01); *H04B 7/024* (2013.01); *H04B 7/0452* (2013.01); *H04B 7/0617* (2013.01); *H04B 7/0639* (2013.01); *H04L 5/0048* (2013.01); *H04L 5/0073* (2013.01)

(58) Field of Classification Search
CPC .. H04B 7/0408; H04B 7/0417; H04B 7/0452; H04B 7/0632
See application file for complete search history.

(56) References Cited

U.S. PATENT DOCUMENTS

| 2008/0039012 A1* | 2/2008 | McKay | H04B 7/1555 455/11.1 |
|---|---|---|---|
| 2011/0319027 A1* | 12/2011 | Sayana | H04B 7/0632 455/67.11 |
| 2012/0051257 A1* | 3/2012 | Kim | H04B 7/024 370/252 |
| 2012/0069887 A1 | 3/2012 | Park et al. | |

(Continued)

FOREIGN PATENT DOCUMENTS

WO 2012108573 A1 8/2012

OTHER PUBLICATIONS

MediaTek (Interference measurement and IMR configuration, 3GPP TSG RAN WG1 meeting #70, R1-123333, Aug. 2012).*

(Continued)

*Primary Examiner* — Michael Thier
*Assistant Examiner* — Zhensheng Zhang
(74) *Attorney, Agent, or Firm* — Joseph Kolodka

(57) ABSTRACT

A method implemented in a base station used in a wireless communications system where different antenna arrays are employed for transmissions to different co-scheduled users in a cell is disclosed. The method includes configuring multiple channel state information (CSI) processes for a user equipment (UE), and configuring, for the UE, a plurality of non-zero power (NZP) CSI reference signal (RS) resources, each of which is associated with an antenna array. Other apparatuses, systems, and methods also are disclosed.

4 Claims, 3 Drawing Sheets

(56) References Cited

U.S. PATENT DOCUMENTS

| | | | | |
|---|---|---|---|---|
| 2013/0114430 A1* | 5/2013 | Koivisto | ............... | H04B 7/024 370/252 |
| 2014/0036796 A1* | 2/2014 | Etemad | ............... | H04W 76/048 370/329 |
| 2014/0078934 A1* | 3/2014 | Hugl | ..................... | H04B 7/024 370/254 |

OTHER PUBLICATIONS

ZTE, 'Aperiodic CSI feedback modes for CoMP', 3GPP TSG RAN WG1 Meeting #70, R1-123381, Qingdao, China, Aug. 13-17, 2012 (http://www.3gpp.org/ftp/tsg_ran/wg1_rl1/TSGR1_70/Docs/) See p. 1, lines 26-28; p. 2, lines 6-9, 14, 23; p. 3, lines 14-16; p. 4, lines 10-11: and tables 1-2.

NEC Group, "MU-MIMO: CQI Computation and PMI Selection," 3GPP TSG RAN WG1 R1-103832.

NEC Group ,"DL MU-MIMO enhancement via Residual Error Norm feedback," 3GPP TSG RAN WG1 R1-113874.

Zte, "Aperiodic CSI feedback modes for CoMP", 3GPP Draft: R1-123381 Compaperiodiccsi, 3rd Generation Partnership Project (3GPP), Mobile Compotence Centre; 650, Route Des Lucioles; F-06921 Sophia-Antipolis Cedex; France, vol. RAN WG1, no. Qiangdao, China, 20120813, Aug. 5, 2012, XP 050661269.

Samsung, "Interference Assumptions Based on Non-Zero Power CSI-RS", 3GPP draft; R1-123463 NZP IMR, 3rd Generation Partnership Project (3GPP), Mobile Competence Centre, 650, Route Des Lucioles, F-06921, Sophia-Antipolis Cedex; France, vol. RAN WG1, no Qingdao, China, XP050661342.

\* cited by examiner

306
- The base station configures the multiple CSI processes for one NZP CSI-RS resource.
- The base station configures, for one of the multiple CSI processes designated as a reference CSI process, the UE to transmit CSI feedback assuming single-user (SU) multiple-input and multiple-output (MIMO).

307
The base station configures, for the rest of the multiple CSI processes, the UE to emulate interference based on an estimated channel from other NZP CSI-RS resources, assuming isotropic interference in a complex space or isotropic interference along an orthogonal subspace of a preferred precoder for a channel in the reference CSI process.

201A
A base station configures configuring multiple channel state information (CSI) processes for a user equipment (UE).

201B
The base station configures, for the UE, a plurality of non-zero power (NZP) CSI reference signal (RS) resources, each of which is associated with an antenna array.

308
The base station configures, for the rest of the multiple CSI processes, the UE to compute a best or worst companion precoding and a resulting channel quality indicator (CQI), assuming that there is a co-scheduled user on each other channel.

FIG. 3

CHANNEL FEEDBACK FOR VERTICAL AND FULL-DIMENSIONAL BEAMFORMING

This application claims the benefit of U.S. Provisional Application No. 61/753,736, entitled "Channel Feedback for Vertical and Full-Dimensional Beamforming," filed on Jan. 17, 2013, the contents of which are incorporated herein by reference.

BACKGROUND OF THE INVENTION

The present invention relates to a mobile or wireless communications system and, more particularly, to channel state information (CSI) feedback in vertical and full-dimensional beamforming operations.

In the recent 3GPP standardization discussions, the vertical/elevation beamforming or its generalizations, full-dimensional (FD) beamforming has been considered as one promising technique for the future cellular systems to reduce the intra-cell and intercell interference and improve the per-cell average spectral efficiency. The vertical and FD or three dimensional (3D) beamforming has been agreed to be a study item in the 3GPP RAN1 standardization. In this invention, we consider the design of channel state information (CSI) reporting schemes to better support the vertical or FD beamforming. In particular, we provide several CSI reporting schemes that includes additional CQI/PMI computed under the assumption of post-scheduling intra-cell interference from other potentially co-scheduled users.

REFERENCES

[1] NEC Group, "MU-MIMO: CQI Computation and PMI Selection," 3GPP TSG RAN WG1 R1-103832.

[2] NEC Group, "DL MU-MIMO enhancement via Residual Error Norm feedback," 3GPP TSG RAN WG1 R1-113874.

BRIEF SUMMARY OF THE INVENTION

An objective of the present invention is to provide a channel state information (CSI) reporting scheme to better support vertical or FD beamforming.

An aspect of the present invention includes a method implemented in a base station used in a wireless communications system where different antenna arrays are employed for transmissions to different co-scheduled users in a cell. The method comprises configuring multiple channel state information (CSI) processes for a user equipment (UE), and configuring, for the UE, a plurality of non-zero power (NZP) CSI reference signal (RS) resources, each of which is associated with an antenna array.

Another aspect of the present invention includes a method implemented in a user equipment (UE) used in a wireless communications system where different antenna arrays are employed for transmissions to different co-scheduled users in a cell. The method comprises receiving multiple channel state information (CSI) processes, and receiving a plurality of non-zero power (NZP) CSI reference signal (RS) resources, each of which is associated with an antenna array.

Still another aspect of the present invention includes a wireless communications system where different antenna arrays are employed for transmissions to different co-scheduled users in a cell. The method comprises a user equipment (UE) and a base station configuring multiple channel state information (CSI) processes to the UE, wherein a plurality of non-zero power (NZP) CSI reference signal (RS) resources, each of which is associated with an antenna array, are configured for the UE.

BRIEF DESCRIPTION OF THE DRAWINGS

FIG. 3 depicts another detailed block diagram for a method disclosed herein.

DETAILED DESCRIPTION

1. Signal Model

In current cellular system, the fixed antenna tilting is employed. The beamforming or precoding considered in the current LTE and LTE-A system is assumed to be the same for the user different location of the cell, e.g., either the cell center or cell edge, if the same beamforming vector is applied. Thus only the horizontal beamforming characteristic is captured in the current system. However, with different antennal tilting or a two-dimensional antenna plane, the base station can form different beamforming patterns targeted to the users in different geographic areas. With such position based beamforming, the co-channel interference can be reduced. Such vertical or FD beamforming is able to achieve high spectral efficiency.

We consider the following signal model for an example with two co-scheduled users. It can be easily extended to the general case with more users or more channels. The received signal at user-1 is given by $$y_1 = H_{11}^\dagger W_{11} x_1 + H_{21}^\dagger W_{22} x_2 + n_1 \qquad (1)$$

where $H_{ij}^\dagger$ denotes the channel matrix for the ith antenna array with different antenna tilts to the jth user, and $W_{ij}$ denotes the precoding used for user j on the channel from the ith array, $\dagger$ denotes the matrix Hermitian, and $n_j$ is the noise plus the intercell interference received at user j. If all the transmit antennas in the base station are transmitted to the target users, we have $H_{11}=H_{21}$. The signal model is then similar to that of multiuser (MU) MIMO. Note that the base station can also schedule user-1 on channel-2, i.e., $H_{21}$. Then the signal model becomes $$y_1 = H_{11}^\dagger W_{12} x_2 + H_{21}^\dagger W_{21} x_1 + n_1. \qquad (2)$$

Also it is possible that the base station does not co-schedule any user on other channels. Therefore, $x_2 = 0$ and there is no intra-cell interference.

2. CSI Feedback Schemes for Vertical or FD Beamforming

Based on the channel estimation of $H_1$ and/or $H_2$, the user sends the CSI feedback to the base station. It is then natural to investigate how to configure the CSI feedback and what to feedback to improve the performance of vertical or FD beamforming.

2.1 Baseline CSI Reporting in LTE

In LTE, based one estimated channel, the CSI report is computed at the user terminal, e.g. user 1, assuming the single user (SU) MIMO transmission to be scheduled, i.e., SU-CSI report. Thus, assuming $H_{11}$ is estimated, the user then sends the CSI report which includes the index (PMI) of preferred precoding matrix $G_1$ in the precoding codebook, the rank of $G_1$, and the quantized signal-to-interference-plus-noise ratios (SNRs) (or channel quality indicators (CQIs)) when the precoding $G_1$ is employed. The rank, $G_1$, and the SNRs should be the results that maximizes user rate with a certain receiver employed at the user end.

2.2 Enhanced CSI Feedback Schemes

Figure 1:
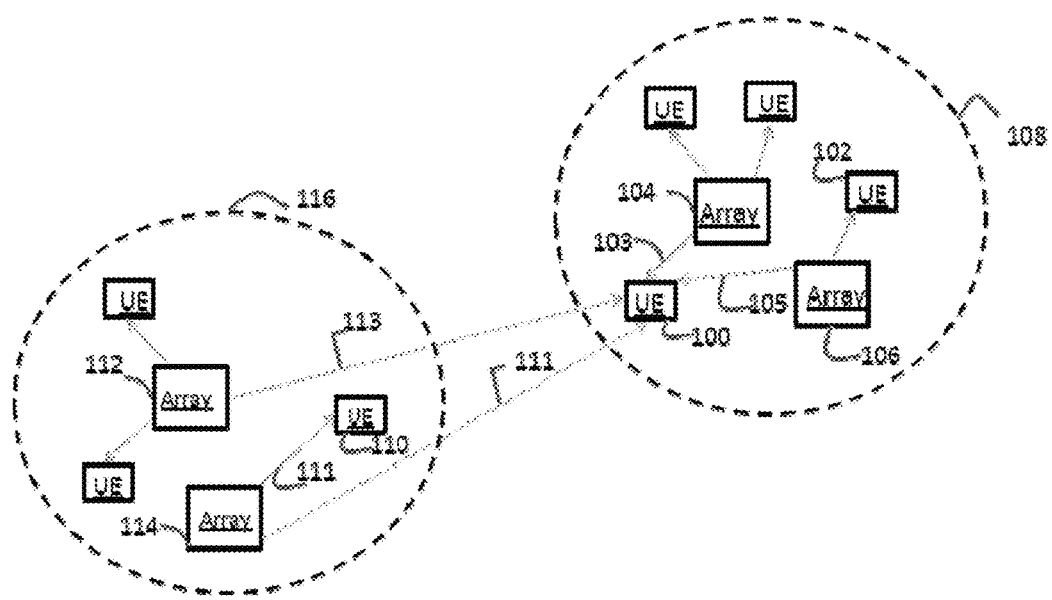
FIG. 1 depicts a vertical or full dimensional beamforming network system.
Figure 2:
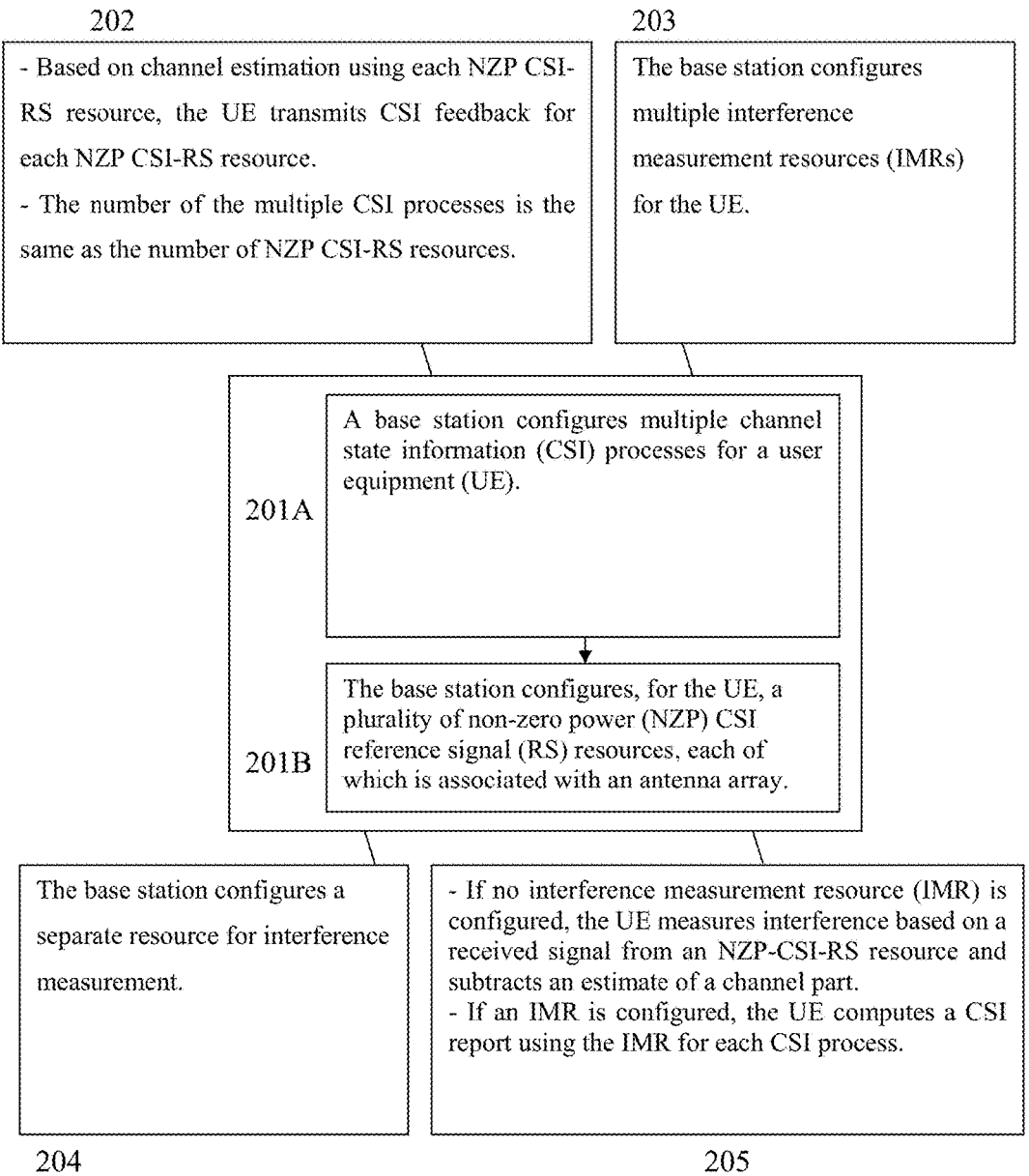
FIG. 2 depicts a detailed block diagram for a method disclosed herein.

For the case that the base station uses all transmit antennas (transmissions with the antenna plane), consequently, the spatial channels are the same, the signal model can then be viewed as a MU-MIMO transmission. Thus, the CSI feedback enhancement for MU-MIMO as described in the appendices can be applied similarly to the CSI feedback for vertical/FD beamforming. Also the signaling and the way of multiplexing the CSI reports described in appendices can also be applied to the CSI feedback for vertical and FD beamforming. Referring to FIG. 1, we now focus on the cases that different antenna arrays 104 and 106 are employed for transmissions to different co-scheduled users 100 and 102 in cell 108. However, it should be noted that the following schemes can be applied to the general cases which include the case of transmissions with the antenna plane:

Since multiple CSI processes and multiple interference measurement resources (IMR) (Block 203 in FIG. 2) can be configured to a UE in 3GPP Rel-11, we then utilize these features and propose the enhanced CSI feedback schemes for the vertical beamforming (Block 201A in FIG. 2). In general we can capture each hypothesis using the mechanism of a CSI-process which is associated with one "channel part" which represents the channel seen from an antenna array (or equivalently a non-zero power (NZP) CSI-RS resource using which a channel estimate can be obtained) and one "interference part". This interference part can in turn be associated with a set of REs (which is a zero-power (ZP) CSI-RS resource referred to as the interference measurement resource (IMR)). The UE can be simply told to directly measure or estimate the covariance matrix of the interference on those REs and it is up-to the controller to configure on those REs the interference it wants the UE to measure. Alternatively, the UE can be configured to measure the interference on an IMR (for instance, interference 111 and 113 from outside of cell 108) and also emulate additional intra-cell interference 105 using the channel estimate determined for serving TP 104 from corresponding NZP CSI-RS resource 103. Interference 111 and 113 may originate from antenna arrays 112 and 114 serve (111) UEs (110 etc.) in another cell 116. Each CSI process can define multiple intervals over which the UE should measure and report its CSI, for instance, the sequence of intervals containing the NZP-CSI-RS resources can be configured by the controller for that UE along with the sequence containing the IMRs, wherein each set of IMR REs is associated with a set of NZP-CSI-RS REs. The UE then uses each such pair of associated sets to compute its CSI and report it.

(a) The base station configures several NZP CSI-RS resources for a UE each of which can be associated to one antenna array (Block 201B in FIG. 2). The base station can configure a separate resource for interference measurement (Block 204 in FIG. 2) but not necessary. Based on the channel estimation using each NZP CSI-RS resource, e.g., $H_{11}$, $H_{21}$, . . . , the user then computes and sends the CSI feedback for each NZP CSI-RS resource. The number of CSI processes is then same as the number of NZP CSI-RS resources (Block 202 in FIG. 2). If no particular IMR is configured, the user then measures the interference based on the received signal from the CSI-RS resource and subtracting the channel part. If an or multiple IMRs are configured, UE then computes the CSI reports using the IMR for each CSI process configured by the network (Block 205 in FIG. 2).

(b) The base station configures several NZP CSI-RS resources for a UE each of which can be associated to one antenna array. For one NZP CSI-RS resource, the base station can configure more than one CSI processes. For one CSI process, which can be configured as the reference CSI process, the base station configures to let UE send CSI feedback assuming no interference, i.e., SU-MIMO CSI report as in conventional CSI feedback (Block 306 in FIG. 3). For additional CSI processes, the base station can configure the UE to emulate the interference based on the estimate channels from other NZP CSI-RS resources assuming isotropic interference in the complex space or isotropic interference along the orthogonal subspace of the preferred precoder for the channel in the referenced CSI process (Block 307 in FIG. 3). For example, the base station configures two NZP CSI-RS resources to let user measure $H_{11}$ and $H_{21}$. The base station can configure two CSI processes with one NZP CSI-RS, e.g. $H_{11}$. For one CSI process, the user feedbacks CSI report including the preferred precoder $G_1$ assuming SU-MIMO transmission without any intra-cell interference as in conventional CSI feedback. In another CSI process, the base station can also configure the UE to compute and feedback the CSI for $H_1$ considering the interference through the channel $H_{21}$. Since the actual interference is not available during the channel feedback, the base station can configure the CSI process and let UE compute the CSI assuming the interference is isotropic, i.e., $H_{21}^\dagger H_{21}$. The UE can also assume (configured by base station) that the interference is isotropic on the orthogonal subspace of the preferred precoder for $H_{11}$, i.e., $H_{21}^\dagger (I - G_1 G_1^\dagger) H_{21}$.

(c) The base station configures several NZP CSI-RS resources for a UE each of which can be associated to one antenna array. For one NZP CSI-RS resource, the base station can configure more than one CSI processes. For one CSI process, which can be configured as the reference CSI process, the base station configures to let UE send CSI feedback assuming no interference, i.e., SU-MIMO CSI report as in conventional CSI feedback. For additional CSI processes, the base station can configure the UE to compute the best or worst companion precoding and the resulting CQI assuming that there is a co-scheduled user on other channels (Block 308 in FIG. 3). For example, the base station configures two NZP CSI-RS resources to let user measure $H_{11}$ and $H_{21}$. The base station can configure two CSI processes with one NZP CSI-RS, e.g. $H_{11}$. For one CSI process, the user feedbacks CSI report including the preferred precoder $G_1$ assuming SU-MIMO transmission without any intra-cell interference as in conventional CSI feedback. In another CSI process, the base station can also configure the UE to compute the CSI for $H_{11}$ considering the interference through the channel $H_{21}$ with a precoder $G_2$, i.e., $H_{21}^\dagger G_2 G_2^\dagger H_{21}$ (assuming $G_1$ is employed). The UE then feedbacks the CSI report including index of $G_2$ and corresponding SNRs, which results in the largest (the best companion) or the smallest (the worst companion) sum-rate of the UE for $H_{11}$.

Appendix A Enhanced MU-MIMO Operation Via Residual Error Norm Feedback

Under this scheme when configured by the eNB, the user reports SU-MIMO CSI plus a residual error term. The eNB can configure a user (to report the additional feedback) in a semi-static manner. We consider a simple form of residual error referred to as the residual error norm. Using SU-MIMO rules the user of interest first determines the SU- MIMO CSI comprising of a PMI V of some rank r along with r quantized signal-to-interference-plus-noise ratios (SINRs) $\{\hat{SINR}^i\}_{i=1}^r$. Note that r can be determined by the user or it can be enforced by the eNB via codebook subset restriction. The residual error norm is determined by the user as $\tilde{\varepsilon}=\sqrt{tr(FH^\dagger PHF^\dagger)}$, where tr(.) denotes the trace operation, $H^\dagger$ denotes the channel matrix seen in the DL by the user of interest and F denotes the filter matrix it computes for SU-MIMO CSI generation and $P=(I-V V^\dagger)$ is a projection matrix. Note that $\tilde{\varepsilon}$ represents the residual total energy in the component of the filtered channel that lies in the orthogonal complement of the reported precoder V. The user reports the usual SU-MIMO CSI along with the residual error norm $\tilde{\varepsilon}$ or a normalized residual error norm $\varepsilon$ computed using $\varepsilon=\sqrt{tr(FH^\dagger PHF^\dagger D^{-1})}$, where $D=diag\{\hat{SINR}^1,\ldots,\hat{SINR}^r\}$. The eNB can use the residual error norms reported by the users to determine accurate SINRs for any choice of user pairing in MU-MIMO. To achieve this, consider the case when the pairing includes the user of interest. The eNB employs a finer approximation of the filtered channel matrix $(F H^\dagger)$ of the user given by $F H^\dagger \approx D^{1/2}(V^\dagger + R^\dagger Q^\dagger)$, where $Q \in \mathbb{C}^{M \times M-r}$ is a semi-unitary matrix whose columns lie in the orthogonal complement of V, i.e. $Q^\dagger V = 0$ and $R \in \mathbb{C}^{M-r \times r}$ is a matrix which satisfies that Frobenius-norm constraint $$\|R\|_F^2 = \frac{\rho}{r}\varepsilon^2,$$

where $\varepsilon > 0$ is the normalized residual error norm reported by the user and $\rho$ denotes the energy per resource element (EPRE) or equivalently an average transmit power or average transit power bound configured for that user, while $$D = \frac{r}{\rho}\text{diag}\{\hat{SINR}^1,\ldots,\hat{SINR}^r\}.$$

Then, suppose the transmit precoder selected by the eNB, U, is parsed as $U=[\underline{U}, \tilde{U}]$, where $\tilde{U}$ includes columns of the transmit precoder matrix intended for the other co-scheduled (paired) users. For a well designed transmit precoder, the eNB can make the reasonable assumption that $\underline{U}$ (almost) lies in the span of V whose columns represent the preferred directions along which the user wishes to receive its intended signal (so that $Q^\dagger \underline{U} \approx 0$). Accordingly, a model more tuned to MU-MIMO operation can be obtained in which the channel output seen by the user of interest post MU-MIMO scheduling is modeled as $$y = D^{1/2}V^\dagger \underline{U}s + D^{1/2}(V^\dagger + R^\dagger Q^\dagger)\tilde{U}s + \eta. \quad (3)$$

The model in (3) accounts for the fact that the component of $\tilde{U}$ in the orthogonal complement of V can also cause interference to the user. Recall that when only SU-MIMO CSI along with the normalized residual error norm is reported by the users, in the model in (3) the eNB can only infer that the semi-unitary matrix Q lies in the subspace determined by $I-V V^\dagger$ and R is also not known except for the fact that $$tr(R^\dagger R) = \frac{\rho}{r}\varepsilon^2.$$

In [2] we describe how the eNB can utilize the model in (3) for MU-MIMO SINR computation.

Appendix A.1 Re-Interpreting Residual Error Norm

Recall that the REN is given by the expression $\tilde{\varepsilon} = \sqrt{tr(FH^\dagger PHF^\dagger)}$. Here $P=I-V V^\dagger$ and in-fact the covariance matrix of the random vector z isotropically distributed in the range of the projection P is equal to $E[z z^\dagger] = \delta P$, where $\delta > 0$ is a scalar. Consequently, since $tr(F H^\dagger E[z z^\dagger] H F^\dagger) = E[z^\dagger H F^\dagger F H^\dagger z]$, we can see that REN is equal (up to a scaling factor) to the average received power (equivalently the SINR under SU transmission) of a signal sent along a precoding vector that is distributed istropically in the range of P and where the filter F is used. This insight leads to the observation that the REN can be approximated by considering a codebook subset formed by vectors in the codebook that are orthogonal to V and then computing the CQI for each one of them using SU-MIMO rules, where the filtered channel matrix $F H^\dagger$ is used as the effective channel matrix[1] and finally averaging those CQIs.

[1] When V is a rank one vector we can ignore F.

Appendix B Enhanced MU-MIMO Operation Via MU-MIMO CQI and PMI

Under this scheme the user itself assumes a post-scheduling model of the form $$y = H^\dagger Vs + H^\dagger Us + \eta. \quad (4)$$

where V denotes the precoder under consideration (or determined a-priori using SU-MIMO rules) and U is assumed by the user to be isotropically distributed in the range of $I-V V^\dagger$. Then, to compute MU-SINRs the user can be configured to assume a particular number of columns in U with an equal power per scheduled stream or to assume a non-uniform power allocation in which a certain fraction of EPRE is shared equally among all columns of U with the remaining fraction being shared equally among all columns in U [1].

Appendix C More Enhanced User Feedback

We first note that the residual error, i.e., the component of the filtered user channel $F H^\dagger$ in the orthogonal complement of V is given by $(I-V V^\dagger) H F^\dagger$. After normalization using D, this component becomes $(I-V V^\dagger) H F^\dagger D^{-1/2}$. The user reports V as well as D. In addition, the user can report some information about the normalized component in the orthogonal complement (normalized residual error). As aforementioned, a simple option is to report the normalized residual error norm $$\varepsilon = \sqrt{tr((FH^\dagger PHF^\dagger D^{-1}))}. \quad (5)$$

More involved options can enable even more accurate SINR computation at the eNB for any choice of user pairing in MU-MIMO. These include the following:

User-1 obtains the QR decomposition of $(I-V V^\dagger) H F^\dagger D^{-1/2}$ given by $$(I-VV^\dagger)HF^\dagger D^{-1/2} = Q'R', \quad (6)$$

where $Q' \in \mathbb{C}^{M \times M-r}$ is a semi-unitary matrix whose columns lie in the orthogonal complement of V, i.e. $Q'^\dagger V = 0$ and $R' \in \mathbb{C}^{M-r \times r}$ is a matrix which satisfies the Frobenius-norm constraint $\|R'\|_F^2 = \varepsilon^2$, where $\varepsilon$ is the normalized residual error norm. Notice that the matrix Q' in (6) is the same as Q in (3), whereas $$R = \sqrt{\frac{\rho}{r}} R'.$$

Then, the user-1 can report the first few largest diagonal values of R' along with the corresponding columns of Q after quantizing them. In addition, it can also report the normalized residual error norm ε. The number of diagonal values of R' to be reported can be configured by the eNB or the user can report all diagonal values greater than a threshold specified by the eNB. The eNB receives this report and employs it for SINR computation.

In another form of residual error feedback the user can obtain the singular value decomposition of $(I-V V^\dagger) H F^\dagger D^{-1/2}$ given by $$(I-VV^\dagger)HF^\dagger D^{-1/2}=USW^\dagger, \quad (7)$$

where $U \in \mathbb{C}^{M \times M-r}$ and $W \in \mathbb{C}^{r \times r}$ are semi-unitary and unitary matrices, respectively, and the diagonal values of S are the singular values. Then, the user-1 can report the first few largest singular values in S along with the corresponding columns of U after quantizing them. In addition, it can also report the normalized residual error norm ε. The number of singular values to be reported can be configured by the eNB or the user can report all singular values greater than a threshold specified by the eNB. The eNB receives this report and employs it for SINR computation.

Appendix D Signaling Enhanced User Feedback

In each channel state information (CSI) reporting interval the user reports its CSI. The eNB can configure a user for periodic CSI reporting and fix the periodicity and offset which together determine the exact sequence of intervals for which the user should report its CSI. This sequence will be henceforth referred to as the sequence for CSI reporting.

Appendix D.1 Multiplexing Enhanced and Baseline CSI Feedback

In order to obtain the benefits of accurate MU-MIMO SINR computation without excessive feedback overhead, the eNB can multiplex intervals in which the user reports enhanced feedback with the ones in which it reports only its SU-MIMO CSI feedback. The periodicity and offset of the sub-sequence formed by intervals designated for enhanced feedback within the sequence for CSI reporting can be configured by the eNB, based on factors such as user mobility. Then, we have the following points that are of particular interest:

In the sequence for CSI reporting, in the intervals designated for only SU-MIMO CSI feedback, the user reports its preferred precoder matrix V and the corresponding quantized SINRs (determined using SU-MIMO rules). The user can select its preferred precoder matrix from a codebook of matrices under the constraint that it must be of a particular rank specified by the eNB or belong to a codebook subset specified by the eNB, or it can freely choose its preferred precoder matrix if no restrictions have been imposed by the eNB.

In each interval designated for enhanced feedback, the user can first determine its SU-MIMO CSI comprising of a precoder V and corresponding SINRs using SU-MIMO rules. As aforementioned, the user follows the restriction (if any) on rank or codebook subset that has been imposed by the eNB. The user uses V and D (formed by the corresponding quantized SINRs) to determine any one of the forms of the residual error feedback described above. The particular feedback form will be configured by the eNB. The user then reports its SU-MIMO CSI along with the particular residual error feedback form. Differential feedback can be exploited in reporting the SU-MIMO CSI and the residual error feedback form. For instance, if the residual error feedback form consists of only the quantized residual error norm, then the user can report the SU-MIMO CSI and the difference of the largest (or smallest) reported SU-MIMO SINR and the residual error norm. The user adopted convention for differential feedback is also configured by the eNB allowing it to reconstruct the residual error feedback form.

Alternatively, in each interval designated for enhanced feedback, the user can first determine its SU-MIMO CSI under a restriction on rank or codebook subset that has been imposed by the eNB, where the said restriction applies only to intervals designated for enhanced feedback. The eNB can freely choose any restriction for the other intervals in the sequence for CSI reporting. The user then uses the determined precoder V and D (formed by the corresponding quantized SINRs) to determine the eNB configured residual error feedback form and reports it along with its SU-MIMO CSI.

Another option for each interval designated for enhanced feedback is also possible. Here the rank of the precoder V to be determined via SU-MIMO rules, can itself be a function of the previous S ranks of the precoders selected by the user in the previous S intervals designated for only SU-MIMO CSI feedback. The function is pre-defined and known to both the user and the eNB. An example is where S=1 and the rule is that rank selected for the current interval designated for enhanced feedback is equal to one when the rank in the previous interval designated for only SU-MIMO CSI feedback is also equal to one; and the rank in the current interval is two otherwise. Alternatively, V itself can be a function of the previous S precoders (and their corresponding SINRs) selected by the user in the previous S intervals designated for only SU-MIMO CSI feedback. The function is pre-defined and known to both the user and the eNB. In this case V need not be reported by the user since it can be deduced by the eNB.

Note that special cases of the sequence for CSI reporting described above, are the baseline case where each interval in the sequence is designated for SU-MIMO CSI only feedback and the one where each interval in the sequence is designated for enhanced feedback. Finally, as an option to reduce feedback overhead, in all the aforementioned alternatives the CSI reports can include a wideband precoder matrix (i.e., a precoder matrix common for all sub-bands) along with sub-band specific SINRs and sub-band specific residual error feedback forms.

Appendix D.2 Combining Enhanced and Baseline Feedback

In order to obtain full benefits of accurate MU-MIMO SINR computation and scheduling flexibility, we can combine SU-MIMO CSI reporting and enhanced CSI reporting. Then, we have the following points of particular interest:

In each interval, the user can first determine its preferred precoder matrix G and the corresponding quantized SINRs using SU-MIMO rules. The user can select its preferred precoder matrix under the constraint that it must be of a particular rank specified by the eNB or belong to a codebook subset specified by the eNB, or it can freely choose its preferred precoder matrix if no restrictions have been imposed by the eNB. Next, in the same interval the user can determine another precoder matrix V and corresponding SINRs using SU-MIMO rules. The eNB can set a separate restriction on rank or codebook subset which V must obey. Notice in this case that if the rank enforced on V happens to be equal to that of G, then V and its corresponding quantized SINRs need not be reported since they are identical to G and its corresponding quantized SINRs, respectively, since both the pairs are determined using SU-MIMO rules. Alternatively, the rank of precoder V can itself be a function of the rank of G. The function is pre-defined and known to both the user and the eNB. An example rule is where rank of V must be equal to one when the rank of G is one; and the rank of V is two otherwise. In either case, using V along with the corresponding SINRs, the user determines the eNB configured residual error feedback form. The user feedback report now includes G and corresponding quantized SINRs as well as V, its corresponding quantized SINRs and the residual error feedback form. Again, differential feedback can be exploited in reporting this CSI.

Alternatively, V itself can be a function of G and the SINRs corresponding to G and thus need not be reported since the function is pre-defined and known to both the user and the eNB. For instance, V can be the column of G for which the corresponding SINR is the largest among all SINRs corresponding to G. Note here that if V is identical to G then even the quantized SINRs corresponding to V need not be reported since they are identical, respectively, to the quantized SINRs corresponding to G.

Finally, as an option to reduce feedback overhead, in all the aforementioned alternatives the CSI reports can include wideband G, V along with sub-band specific SINRs and sub-band specific residual error feedback forms.

Appendix E Signaling Enhanced User Feedback Via Multiple CSI Processes

Notice that CSI is computed by the user under the assumption of a transmission hypothesis. For instance, SU-MIMO CSI is computed by the user under the assumption that it alone would be served by the eNB (or the transmission point (TP) in its cell) and no other user will be co-scheduled with it on its assigned RBs, so that there is no intra-cell interference but only inter-cell interference (ICI) due to transmissions by TPs of other cells. On the other hand, MU-MIMO CSI is computed by the user under the assumption that other users will be co-scheduled so that there will be intra-cell interference post-scheduling as well. In general we can capture each hypothesis using the mechanism of a CSI-process which is associated with one "channel part" which represents the channel seen from the serving TP (or equivalently a non-zero power (NZP) CSI-RS resource using which a channel estimate can be obtained) and one "interference part". This interference part can in turn be associated with a set of REs (which is a zero-power (ZP) CSI-RS resource referred to as the interference measurement resource (IMR)). The UE can be simply told to directly measure or estimate the covariance matrix of the interference[2] on those REs and it is up-to the controller to configure on those REs the interference it wants the UE to measure. Alternatively, the UE can be configured to measure the interference on an IMR (for instance the interference from outside the cell) and also emulate additional intra-cell interference using the channel estimate determined for the serving TP from the corresponding NZP CSI-RS resource. Each CSI process can define multiple intervals over which the UE should measure and report its CSI, for instance, the sequence of intervals containing the NZP-CSI-RS resources can be configured by the controller for that UE along with the sequence containing the IMRs, wherein each set of IMR REs is associated with a set of NZP-CSI-RS REs. The UE then uses each such pair of associated sets to compute its CSI and report it.

[2] For brevity we will henceforth drop the term "covariance matrix" and just use "measure/estimate the interference".

We note that to achieve the maximal MU-MIMO gains, the network can allow multiple CSI-processes to be configured for a UE, with different IMRs and/or different rules for emulation of respective interferences and computation of respective CSI. As a baseline, the SU-MIMO feedback can be obtained by a CSI-process in which the IMR is configured for the UE to measure the ICI and the NZP-CSI-RS resource is configured to allow the UE to obtain a channel estimate from the serving TP in its cell. A special value for the IMR would be a default value which indicates that no REs have been reserved to allow the UE to directly measure inter-cell interference (ICI). In this case the UE could for instance first estimate the channel from the NZP CSI-RS resource REs and then use the same REs for ICI estimation (after subtracting the product of the estimated channel and the reference symbols) as well.

In order to limit the overhead and complexity a limit can be placed on the number of distinct CSI-processes that can be configured for a UE. A good value for such a limit is two. Before proceeding, we note that the "sequence of intervals in which the UE reports only its SU-MIMO CSI feedback" as discussed in Appendix D.1 can equivalently be described by the baseline CSI-process discussed here. Similarly, each example of "the sequence of intervals in which the UE reports its enhanced feedback" discussed in Appendix D.1 is equivalent to another CSI-process, for which a different rule for CSI computation has been configured. We consider some examples of CSI processes in the following:

To enable MU-MIMO CSI computation at the UE a CSI-process can be configured as follows. The UE can be configured to measure the ICI on an IMR (or using other REs when no IMR is assigned as described before) and also emulate additional intra-cell interference. The UE can be configured to do this emulation using the precoder determined for another reference baseline CSI-process and after assuming that the intra-cell interfering signals are isotropically distributed in a subspace of the $M_t$ dimensional vector space $\mathbb{C}^{M_t}$, where $M_t$ denotes the number of transmit antennas at the serving TP. This subspace can be defined as the range of $I-VV^\dagger$, where V denotes the precoder that has been determined and reported by the user for (a corresponding interval in) the reference baseline CSI process. The intuition here is that V represents the preferred directions along which the user wishes to receive its data so a good MU-MIMO transmit precoder should ensure that the data for co-scheduled users is sent along directions (vectors) in the orthogonal complement, $I-VV^\dagger$. We note that the covariance matrix of such interference is $\alpha\rho H^\dagger(I-VV^\dagger)H$ where the factor $\alpha$ can be used by the controller to semi-statically control the UE's assumption about intra-cell interference power.

Alternatively, instead of assuming an isotropic distribution, the UE can compute the intra-cell interference by assuming the interfering vectors to be uniformly distributed in a pre-determined precoder codebook subset, where one such subset (along with a power scaling factor) can be configured semi-statically for each possible choice of V. Note that in either case only the MU-SINRs need to be computed and reported.

Instead of directly using the PMI of the reference baseline CSI process, the UE can be configured to follow rules to obtain the PMI from those determined in the reference baseline CSI process, in the same manner as described in Appendix D.1 for deriving the PMI to be used in the interval for enhanced CSI reporting from those determined in the intervals designated as SU-MIMO CSI feedback intervals.

The eNB can configure the UE to determine MU-CSI (including both PMI and CQIs) without using the PMI of the baseline process. In this case the UE can systematically check each precoder V in another subset configured semi-statically for that process and for each V it can perform the intra-cell interference emulation as described above and compute MU-SINRs. The UE then selects a PMI and reports it along with the corresponding SINRs.

In another variation, the UE can be configured to assume one (intra-cell) interferer. In particular, the PMI V from the reference baseline process is assumed to be the desired PMI (along which the desired signal would be sent) and another companion PMI V is also determined, which the UE assumes to the intra-cell interferer (one along which the signal for the co-scheduled user would be sent). The power scaling factor that the UE should assume for the interferer can be semi-statically configured. The UE then determines and reports the companion PMI along with the MU-SINRs. Additionally, the UE can be configured to assume a specific codebook subset in its search for the companion PMI, where this subset is configured and conveyed semi-statically to it by the eNB and the choice of subset itself can vary with that of the desired PMI V.

As mentioned earlier, each example of "the sequence of intervals in which the UE reports its enhanced feedback" as discussed in Appendix D.1 can be equivalently described by a CSI-process. This process specifies a rule for computing a residual error feedback form. The UE computes the CSI accordingly and reports it. The re-interpretation of the REN described in Appendix A.1 can for instance be used to design such a rule.

Simple dependencies in the CSI computation rules can be introduced across different CSI processes. For instance a CSI process can specify a rule where the PMI in the reference baseline process, V is first used to identify a codebook subset. Then SU-MIMO rules are followed to determine a suitable PMI (along with the corresponding SINRs) in that subset. This subset is configured and conveyed semi-statically to the user by the eNB and the choice of subset itself can vary with that of the reference PMI V. One example of a subset for a particular V is that formed by precoders that are orthogonal to V. In this case it can be seen that the CSI rule described above specifies an enhanced feedback form (Appendix C) since the PMI and SINRs so obtained enable an approximation of the component of the filtered channel matrix in the orthogonal complement of V.

We can define the notion of a CSI-pattern that comprises of a set of CSI-processes. A codebook of such patterns can be defined and disclosed to the UE in a semi-static manner. Then, the controller can dynamically or semi-statically signal an index from the codebook to the UE which identifies a pattern. The UE can then compute CSI as per the rule defined for each CSI-process in that pattern and feed them back. In case of semi-static signaling the UE can be configured to follow the most recently signaled pattern until a new one is signaled to it. To reduce the overhead, while defining a pattern one or more of its CSI-processes can be marked CQI-only, i.e, the UE does not compute PMI/RI in the CSI computed for these CSI-processes. Instead, for each such process it will use the PMI of another CSI process in that pattern which is indicated to be the reference for that process. The reference process whose PMI is to be used is also fixed separately for each such CQI-only marked process. Furthermore, some processes can be marked as those requiring wideband PMI and/or wideband CQI(s) and consequently, the UE will only compute and report wideband PMI and/or wideband CQI(s) for such processes. Additionally, a separate codebook subset restriction can be placed on each process and/or a separate maximum rank limit can be placed on each process. Optionally, a common rank restriction can be imposed on all processes in a pattern. Further specializing this restriction, a CSI process in the pattern can be marked to indicate that the UE should first compute CSI (including RI) for that process and then use the computed RI for all the remaining processes. All such optimizations can be done semi-statically while defining a codebook and the codebook and attributes (or markings) of each process in each pattern in the codebook are conveyed to the UE semi-statically. Then the index of a pattern can be conveyed in a dynamic manner and the UE will report CSI following the indexed pattern and the attributes and rules of its constituent CSI processes. Notice that the codebook can be defined on a UE-specific manner. Alternatively, a codebook can be defined in a cell-specific manner so that each UE can know the codebook based on its assigned cell.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a base station used in a wireless communications system where different antenna arrays in a single cell are employed for transmissions to different co-scheduled users in the single cell, the method comprising:
   configuring multiple channel state information (CSI) processes for a user equipment (UE);
   configuring, for the UE, a plurality of non-zero power (NZP) CSI reference signal (RS) resources, each of which is associated with an antenna array;
   configuring the multiple CSI processes for one NZP CSI-RS resource;
   configuring, for one of the multiple CSI processes designated as a reference CSI process, the UE to transmit CSI feedback assuming single-user (SU) multiple-input and multiple-output (MIMO); and configuring, for at least one of the multiple CSI processes, the UE to emulate interference based on an estimated channel from other NZP CSI-RS resources, assuming isotropic interference in the orthogonal complement subspace of a precoder determined for a channel in another reference baseline CSI process, and scaling the emulated interference using a configured scaling factor, and configuring for at least one of the multiple CSI processes, the UE to compute a best or worst companion precoding and a resulting channel quality indicator (CQI), assuming that there is a co-scheduled user on each other channel;

configuring multiple interference measurement resources (IMRs) for the UE wherein each set of IMR Res is associated with a set of NZP-CSI-RS REs and the UE then uses each such pair of associated sets to compute its CSI and report it;

wherein the antenna arrays exhibit a two-dimensional antenna plane such that vertical/full-dimensional (FD) beamforming is performed by the antenna arrays; and wherein the intra-cell interfering signals are isotropically distributed in the subspace of the $M_t$ dimensional vector space $\mathbb{C}^{M_t}$, where $M_t$ denotes a number of transmit antennas at a serving TP and the subspace is defined as the range of $I-V V^\dagger$, where V denotes the precoder that has been determined and reported by a user for a corresponding interval in the reference baseline CSI process.

2. The method as in claim 1, wherein, based on channel estimation using each NZP CSI-RS resource, the UE transmits CSI feedback for each NZP CSI-RS resource, and wherein the number of the multiple CSI processes is the same as the number of NZP CSI-RS resources.

3. The method as in claim 1, further comprising:
configuring a separate resource for interference measurement.

4. The method as in claim 1, wherein, if no interference measurement resource (IMR) is configured, the UE measures interference based on a received signal from and NZP-CSI-RS resource and subtracts an estimate of a channel part, and wherein, if an IMR is configured, the UE computes a CSI report using the IMR for each CSI process.

* * * * *